United States Patent
Nakano et al.

(10) Patent No.: US 8,226,154 B2
(45) Date of Patent: Jul. 24, 2012

(54) VEHICLE DOOR STRUCTURE

(75) Inventors: Takashi Nakano, Odawara (JP); Naoya Kosaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 264 days.

(21) Appl. No.: 12/522,799

(22) PCT Filed: Jan. 3, 2008

(86) PCT No.: PCT/IB2008/000572
§ 371 (c)(1),
(2), (4) Date: Jul. 10, 2009

(87) PCT Pub. No.: WO2008/093241
PCT Pub. Date: Aug. 7, 2008

(65) Prior Publication Data
US 2010/0013266 A1   Jan. 21, 2010

(30) Foreign Application Priority Data
Feb. 1, 2007   (JP) .................. 2007-023279

(51) Int. Cl.
*B60J 5/00* (2006.01)
(52) U.S. Cl. ............. 296/187.12; 296/146.9; 296/146.6; 49/502
(58) Field of Classification Search ............... 296/146.1, 296/146.6, 146.9, 187.12, 187.03, 207; 49/502; *B60J 5/00*
See application file for complete search history.

(56) References Cited

U.S. PATENT DOCUMENTS

| | | | | |
|---|---|---|---|---|
| 1,474,949 A * | 11/1923 | Sundh | ........................... | 138/122 |
| 3,589,687 A * | 6/1971 | Leybourne | ..................... | 261/149 |
| 3,782,036 A * | 1/1974 | Clark et al. | ..................... | 49/502 |
| 4,684,166 A * | 8/1987 | Kanodia | ..................... | 296/146.6 |
| 4,838,606 A * | 6/1989 | Furubayashi et al. | ... | 296/187.12 |
| 5,203,436 A * | 4/1993 | Wieting et al. | .......... | 296/187.12 |
| 5,435,619 A | 7/1995 | Nakae et al. | | |
| 5,536,060 A | 7/1996 | Rashid et al. | | |
| 5,570,558 A * | 11/1996 | Persson | ..................... | 296/146.6 |
| 5,580,120 A * | 12/1996 | Nees et al. | ................. | 296/146.6 |
| 6,135,537 A * | 10/2000 | Giddons | ..................... | 296/146.6 |
| 6,283,539 B1 * | 9/2001 | Enning et al. | ............ | 296/203.03 |
| 6,302,473 B1 * | 10/2001 | Weber | ..................... | 296/146.6 |
| 6,349,521 B1 * | 2/2002 | McKeon et al. | ............. | 293/102 |
| 6,393,767 B1 * | 5/2002 | Fukumoto et al. | ............. | 49/503 |
| 6,779,830 B2 * | 8/2004 | Patberg et al. | ............. | 296/146.6 |

(Continued)

FOREIGN PATENT DOCUMENTS

DE   42 44 470 A1   6/1994
(Continued)

OTHER PUBLICATIONS

Machine Translation of DE196 33 637.*

*Primary Examiner* — Glenn Dayoan
*Assistant Examiner* — Pinel Romain
(74) *Attorney, Agent, or Firm* — Kenyon & Kenyon LLP

(57) ABSTRACT

An impact beam that absorbs an impact of a vehicle collision is provided in a vehicle door, at a position between an inner panel and an outer panel. The impact beam has a wavy portion that undulates in the height direction of the vehicle door. The center axis of the wavy portion extends along the longitudinal direction of a vehicle.

22 Claims, 5 Drawing Sheets

U.S. PATENT DOCUMENTS

| | | | |
|---|---|---|---|
| 6,846,033 B2 * | 1/2005 | Chu et al. | 296/146.6 |
| 7,347,486 B2 * | 3/2008 | Uchida et al. | 296/187.03 |
| 7,610,984 B2 * | 11/2009 | Melz et al. | 180/274 |
| 7,735,901 B2 * | 6/2010 | Melz et al. | 296/146.6 |
| 7,819,462 B1 * | 10/2010 | Owens | 296/146.6 |
| 2002/0153749 A1 * | 10/2002 | Lee | 296/204 |

FOREIGN PATENT DOCUMENTS

| | | |
|---|---|---|
| DE | 43 08 035 A1 | 9/1994 |
| DE | 196 33 637 A1 | 2/1998 |
| DE | 197 36 100 A1 | 2/1998 |
| DE | 102 23 355 A1 | 12/2003 |
| EP | 0 266 084 A2 | 5/1988 |
| JP | 63-110020 A | 5/1988 |
| JP | 2003-211961 A | 7/2003 |
| JP | 2004-051065 A | 2/2004 |
| JP | 2005-162016 A | 6/2005 |
| WO | WO 98/22300 A | 5/1998 |

* cited by examiner

VEHICLE DOOR STRUCTURE

This is a 371 national phase application of PCT/IB2008/000572 filed 3 Jan. 2008, claiming priority to Japanese Patent Application No. 2007-023279 filed 1 Feb. 2007, the contents of which are incorporated herein by reference.

FIELD OF THE INVENTION

The invention relates to a vehicle door structure.

BACKGROUND OF THE INVENTION

A vehicle door is usually provided with an impact beam to protect occupants from an impact of a side collision. The impact beam extends along the longitudinal direction of a vehicle, and absorbs an impact load applied to a side portion of the vehicle. An example of the vehicle door provided with such an impact beam is described in Japanese Patent Application Publication No. 2003-211961 (JP-A-2003-211961).

The vehicle door is provided with a lateral beam, which extends along the width direction of the vehicle door (i.e. the longitudinal direction of the vehicle), and a branch beam. The lateral beam and the branch beam are fixed to fixing portions that are fixed to the main body of the vehicle door. The lateral beam and the branch beam are disposed at different positions in the height direction of the vehicle door. Therefore, the area in which the beams are present becomes wider in the height direction of the vehicle door. As a result, the protective area in the vehicle door, which is protected by the beams, is widened in the height direction of the vehicle door.

However, the vehicle door described in Japanese Patent Application Publication No. JP-A-2003-211961 requires two beams, that is, the lateral beam and the branch beam. This increases the number of vehicle door components and complexity in the structure of the vehicle door.

DISCLOSURE OF THE INVENTION

The invention provides a vehicle door structure with which a protective area in a vehicle door is widened in the height direction of the vehicle door without increasing the number of vehicle door components and complexity in the structure of the vehicle door.

An aspect of the invention relates to a vehicle door structure including an impact beam that is provided in a vehicle door and that absorbs an impact of a vehicle collision. In the vehicle door structure, the impact beam has a wavy portion that undulates in the height direction of the vehicle door. In the aspect of the invention described above, the impact beam may be disposed in such a manner that the center axis of the wavy portion extends along the longitudinal direction of the vehicle.

Because the impact beam has the wavy portion described above, a protective area in the vehicle door, which is protected by the impact beam, is widened in the height direction of the vehicle door. Further, because the wavy portion is formed by, for example, bending the impact beam, neither the number of vehicle door components nor complexity in the structure of the vehicle door is increased. Accordingly, the protective area in the vehicle door is widened in the height direction of the vehicle door, without increasing the number of vehicle door components and complexity in the structure of the vehicle door.

In the aspect of the invention described above, at least one end portion of the impact beam may be bent upward or downward with respect to the center axis of the wavy portion.

Accordingly, even when a load produced at the time of a vehicle collision is applied to, for example, a top end of the wavy portion, the impact beam hardly rotates about the center axis of the wavy portion. As a result, the impact beam absorbs an impact of a vehicle collision more effectively.

According to the vehicle door structure of the invention, the protective area in the vehicle door is widened in the height direction of the vehicle door, without increasing the number of vehicle door components and complexity in the structure of the vehicle door.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Figure 1:
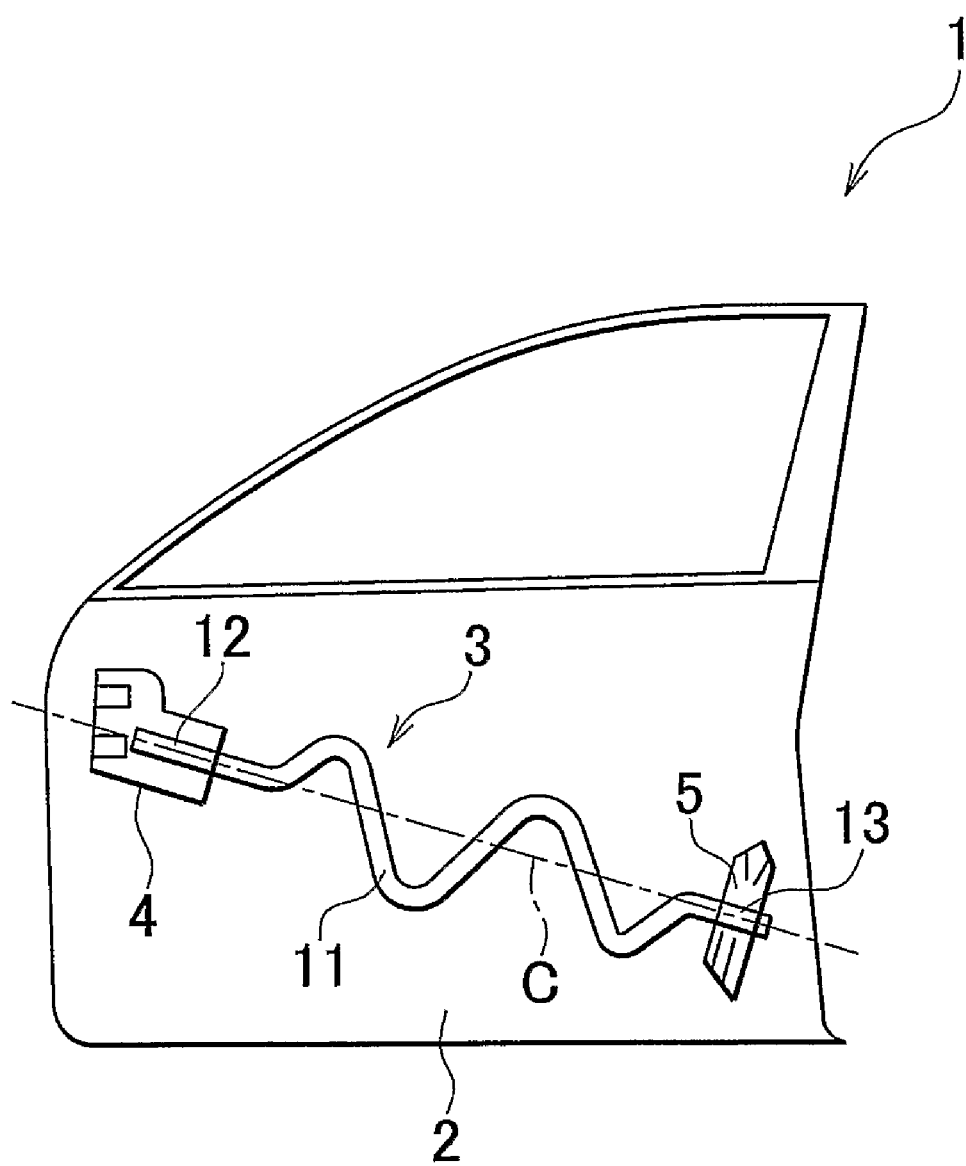
FIG. 1 is a front view showing a vehicle door structure according to a first embodiment of the invention.

Hereafter, embodiments of the invention will be described with reference to the attached drawings. The same elements in the drawings will be denoted by the same reference numerals, and the description thereof will not be repeated. It should be noted that the shapes of some elements shown in the drawings are made different from those in the description in the specification, for convenience of understanding.

FIG. 1 is a front view of a vehicle door structure according to a first embodiment of the invention. FIG. 1 shows a left vehicle door 1 of a vehicle when viewed from the outside of the vehicle. In FIG. 1, the vehicle door 1 is shown with an outer panel removed. The vehicle door 1, shown in FIG. 1, according to the first embodiment of the invention includes an inner panel 2 and an outer panel (not shown). An impact beam 3 is attached to the outer-side surface of the inner panel 2, and the outer panel covers the outer-side surface of the inner panel 2 to which the impact beam 3 is attached.

The impact beam 3 is formed of a pipe member having a circular cross-section, and disposed along the longitudinal direction of the vehicle (i.e. the width direction of the vehicle door 1). The impact beam 3 is formed by processing a straight pipe member in such a manner that a wavy portion 11 is formed therein. The wavy portion 11 is formed by bending a portion of the pipe member up and down. The thus formed impact beam 3 is attached to the inner panel 2 in such a manner that the wavy portion 11 undulates in the height direction of the vehicle door 1 in a side view of the vehicle (i.e. in a front view of the vehicle door 1). A front-end portion 12 and a rear-end portion 13, which are contiguous with the wavy portion 11, are formed at respective end portions of the impact beam 3.

A center axis C of the wavy portion 11 extends along the longitudinal direction of the vehicle. The wavy portion 11 enables the impact beam 3 to protect a wider area in the inner panel 2 in the height direction of the vehicle door 1. The front-end portion 12 of the impact beam 3 is fixed by welding to a front bracket 4 disposed at the front-end portion of the inner panel 2. Further, the rear-end portion 13 of the impact beam 3 is fixed by welding to a rear bracket 5 disposed at the rear-end portion of the inner panel 2. The impact beam 3 is attached to the inner panel 2 by the front bracket 4 and the rear bracket 5.

Next, the effects produced by the vehicle door structure according to the first embodiment of the invention will be described. In the vehicle door structure according to the first embodiment of the invention, the impact beam 3 provided in the vehicle door 1 has the wavy portion 11 that undulates in the height direction of the vehicle door 1. The wavy portion 11 provides the vehicle door 1 with a wider impact receiving surface that receives an impact of a collision between the vehicle door 1 (the side surface of the vehicle) and, for example, another vehicle.

Figure 2A:
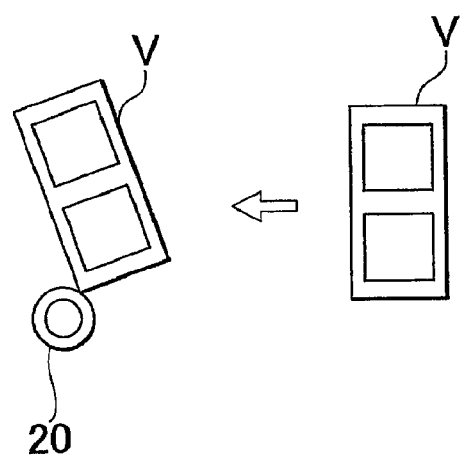
FIG. 2A shows a manner in which a straight impact beam of the host vehicle contacts a bumper member of another vehicle when a side collision occurs.
Figure 2B:
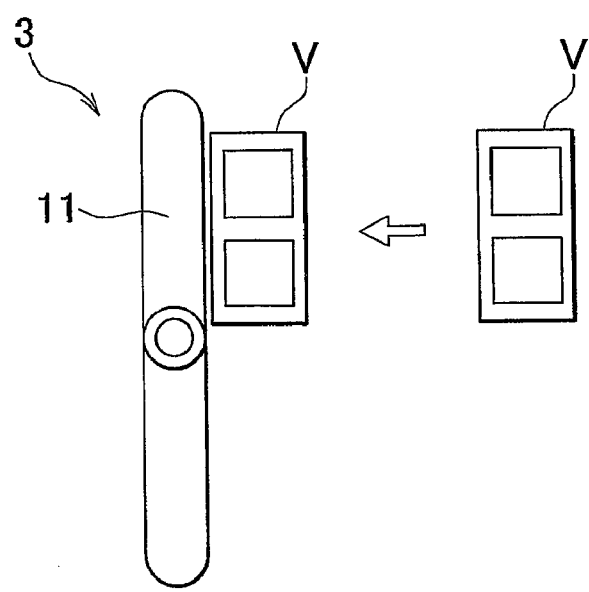
FIG. 2B shows a manner in which the impact beam of the host vehicle according to the first embodiment of the invention contacts a bumper member of another vehicle when a side collision occurs.

With reference to FIG. 2, comparison will be made between the impact beam 3 according to the first embodiment of the invention and a conventional straight impact beam that does not have a wavy portion. FIG. 2A shows a manner in which a straight impact beam of the host vehicle contacts a bumper member of another vehicle when a side collision occurs. FIG. 2B shows a manner in which the impact beam of the host vehicle according to the first embodiment of the invention contacts a bumper member of another vehicle when a side collision occurs. FIG. 2A shows the case in which the other vehicle V collides with the vehicle door provided with the straight impact beam 20. If the position, at which the other vehicle V collides with the vehicle door, corresponds to the position, at which the impact beam 20 is arranged, in the height direction of the vehicle door, a reaction force by which the other vehicle V is pushed back is increased by the impact beam 20. However, as shown in FIG. 2A, when the position, at which the other vehicle V collides with the vehicle door, is higher than the position, at which the impact beam 20 is arranged, in the height direction of the vehicle door, contact between the other vehicle V and the impact beam 20 is insufficient. As a result, the other vehicle V is pushed back by an insufficient reaction force. Similar situation occurs when the position, at which the other vehicle V collides with the vehicle door, is lower than the position, at which the impact beam 20 is arranged, in the height direction of the vehicle door.

On the other hand, the impact beam 3 according to the first embodiment has the wavy portion 11, and the impact beam 3 protects a wider area in the vehicle door 1 in the height direction of the vehicle door 1. Therefore, not only when the other vehicle V collides with the vehicle door 1 at a position near the center axis of the wavy portion 11, but also when the other vehicle V collides with the vehicle door 1 at a position higher than the center axis of the wavy portion 11 as shown in FIG. 2B, a reaction force by which the other vehicle V is pushed back is increased. Accordingly, the protective area in the vehicle door 1, which is protected by the impact beam 3, is widened in the height direction of the vehicle door 1.

The protective area in the vehicle door 1 may also be widened in the height direction of the vehicle door 1 by, for example, providing a plurality of pipe members in the vehicle door 1. On the other hand, the impact beam 3 according to the first embodiment of the invention is formed by bending the straight pipe member. Therefore, the number of vehicle door components and the weight of the impact beam are both reduced, as compared with the configuration in which a plurality of pipe members are used. Accordingly, the protective area in the vehicle door is widened in the height direction of the vehicle door, without increasing the number of vehicle door components and complexity in the structure of the vehicle door.

Next, a second embodiment of the invention will be described. A vehicle door structure according to the second embodiment of the invention differs from the vehicle door structure according to the first embodiment of the invention in shape of the end portions of the impact beam. The other configurations are the same as those in the first embodiment of the invention.

Figure 3:
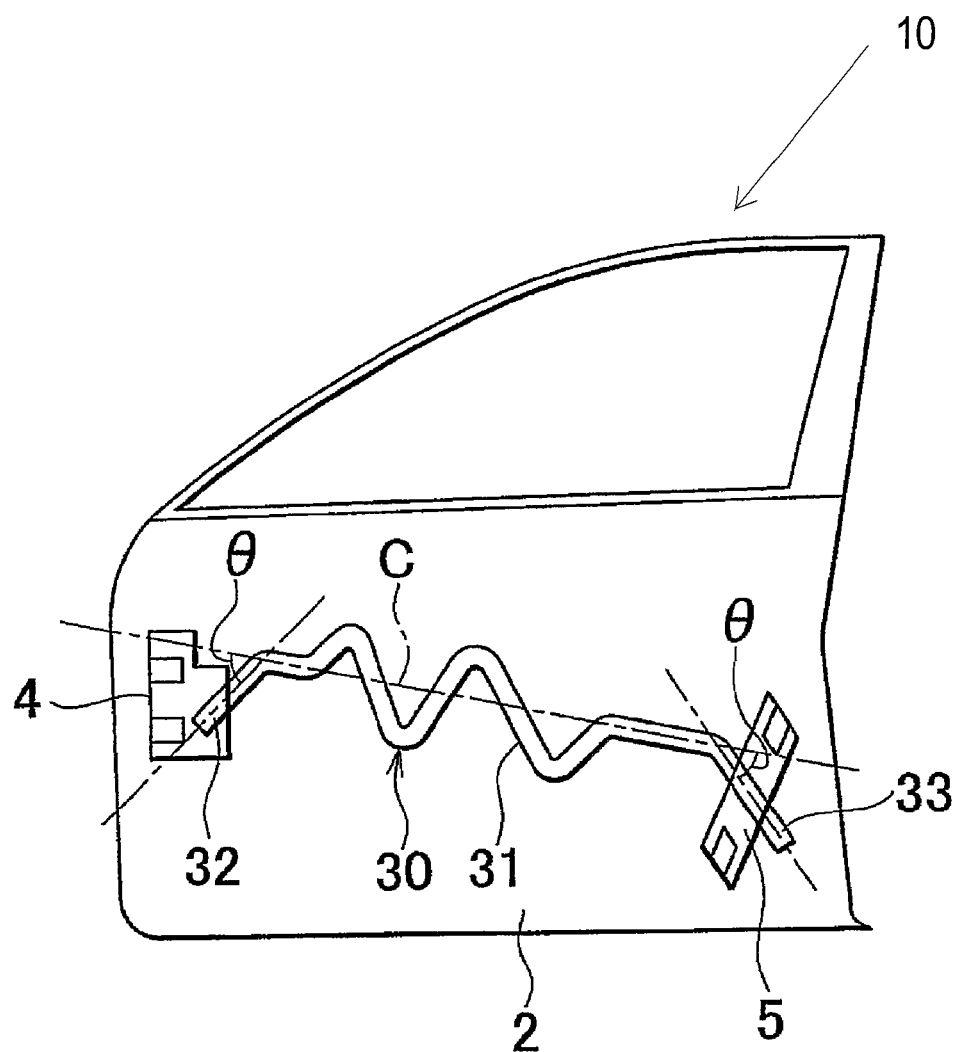
FIG. 3 is a front view showing a vehicle door structure according to a second embodiment of the invention.

As shown in FIG. 3, a vehicle door 10 according to the second embodiment is provided with the inner panel 2, and an impact beam 30 is attached to the inner panel 2. The impact beam 30 is formed of a pipe member, and disposed along the longitudinal direction of the vehicle (i.e. the width direction of the vehicle door). The impact beam 30 is formed by processing a straight pipe member in such a manner that a wavy portion 31 is formed therein. The wavy portion 31 is formed by bending a portion of the pipe member up and down. The thus formed impact beam 30 is attached to the inner panel 2 in such a manner that the wavy portion 31 undulates in the height direction of the vehicle door 10 in a side view of the vehicle (i.e. in a front view of the vehicle door 10). A front-end portion 32 and a rear-end portion 33, which are contiguous with the wavy portion 31, are formed at respective end portions of the impact beam 30.

A center axis C of the wavy portion 31 extends along the longitudinal direction of the vehicle. The wavy portion 31 enables the impact beam 30 to protect a wider area in the inner panel 2 in the height direction of the vehicle door 10. The front-end portion 32 of the impact beam 30 is bent downward to form an angle θ with the center axis C of the wavy portion 31. Further, the rear-end portion 33 of the impact beam 30 is also bent downward to form the angle θ with the center axis C of the wavy portion 31. The impact beam 30 having the wavy portion 31 and the bent end portions 32 and 33 is formed by bending a straight pipe member.

As in the vehicle door structure according to the first embodiment of the invention, in the vehicle door structure according to the second embodiment of the invention described above, the wavy portion 31, which widens the protective area in the vehicle door is in the height-direction of the vehicle door 10, is formed. Therefore, even when another vehicle collides with the vehicle door 10 at a position higher than the center axis of the wavy portion 31, a reaction force, by which the other vehicle is pushed back, is increased by the impact beam 30. Therefore, the protective area in the vehicle door 10 is widened in the height direction of the vehicle door 10. Further, the impact beam 30 according to the second embodiment is formed by bending a straight pipe member. Therefore, the number of vehicle door components and the weight of the impact beam are both reduced.

Figure 4:
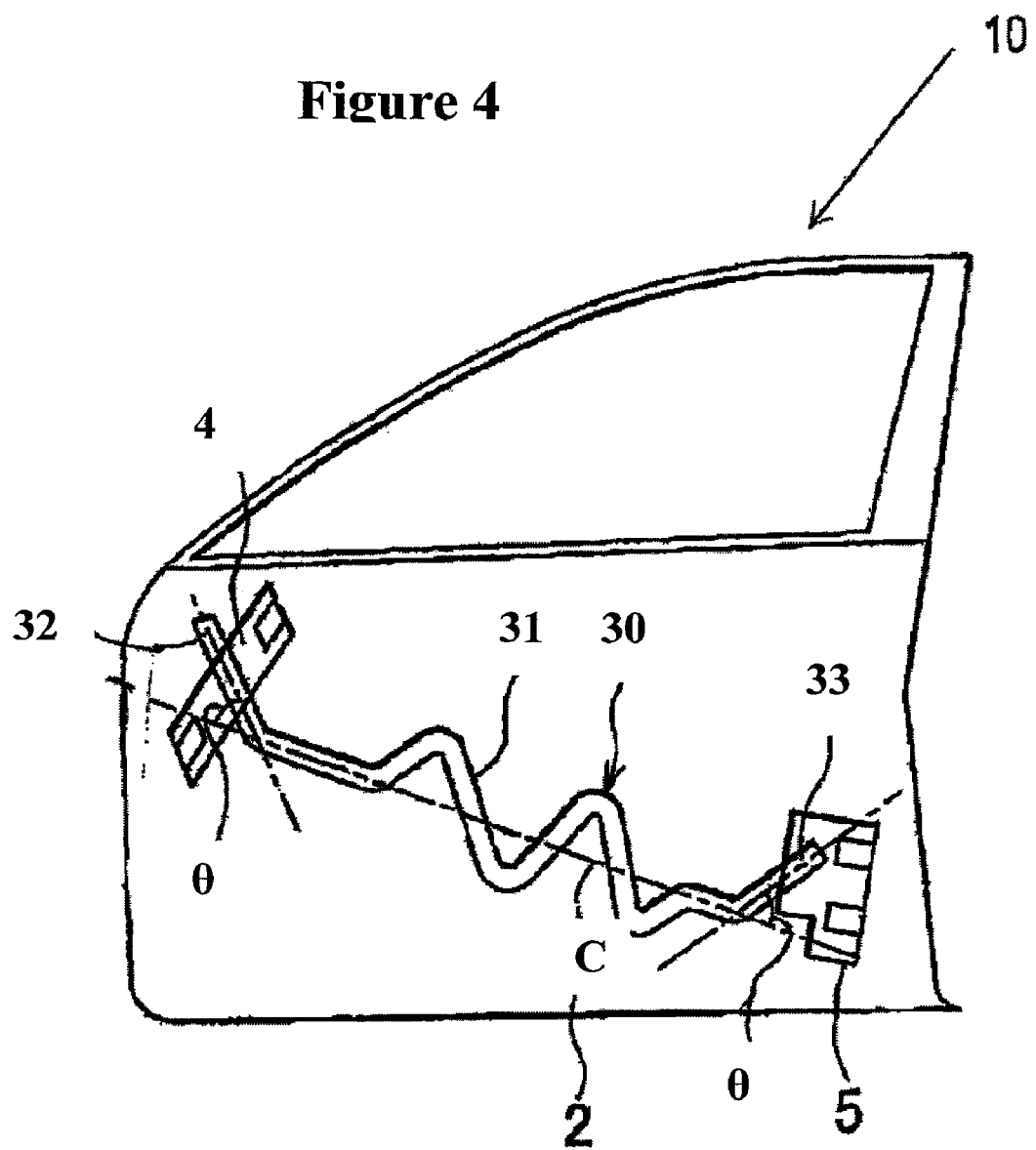
FIG. 4 is a front view showing a vehicle door structure according to a third embodiment of the invention.
Figure 5:
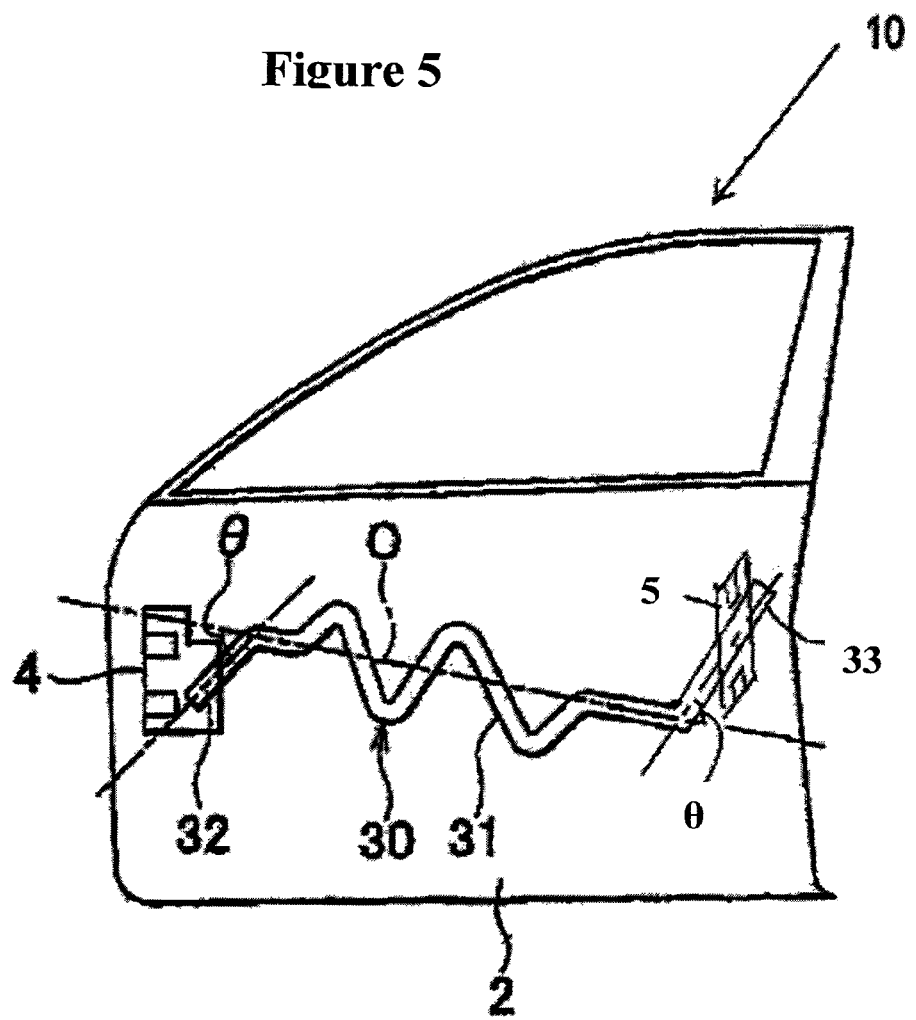
FIG. 5 is a front view showing a vehicle door structure according to a fourth embodiment of the invention.

Further, the vehicle door 10 according to the second embodiment, shown in FIG. 3, is provided with the impact beam 30 of which the end portions 32 and 33 are bent downward. The vehicle door 10 according to the third embodiment, shown in FIG. 4, is provided with the impact beam 30 of which the end portions 32 and 33 are bent upward. The vehicle door 10 according to the fourth embodiment, shown in FIG. 5, is provided with the impact beam 30 of which the end portion 32 is bent downward and end portion 33 is bent upward. Due to this configuration, even when a load (shock) produced at the time of a vehicle collision acts on, for example, the top end of the wavy portion 31, the impact beam 30 hardly rotates about the center axis C of the wavy portion 31. As a result, the impact beam 30 absorbs the impact of a vehicle collision more effectively.

It should be noted that the angle θ formed between each of the bent end portions 32 and 33 of the impact beam 30 and the center axis C of the wavy portion 31 is not limited to a certain value, and may be, for example, 90 degrees, approximately 5 to 10 degrees, or a value larger than 90 degrees. It is preferable that the angle θ be set to 90 degrees in order to effectively prevent the rotation of the impact beam 30 about the center axis C of the wavy portion 31. However, the angle θ may be set to any appropriate value based on other factors, for example, based on how the impact beam 30 is arranged or the shape of the wavy portion 31.

In the aforementioned embodiments of the invention, the impact beam is formed by bending one rod member (i.e. pipe member) in such a manner that the wavy portion is formed therein. As a result, the protective area in the vehicle door is widened in the height direction of the vehicle door, without increasing the number of vehicle door components and complexity in the structure of the vehicle door.

While the invention has been described with reference to example embodiments thereof, it is to be understood that the invention is not limited to the example embodiments. For example, in the aforementioned embodiments of the invention, a pipe member having a circular cross-section is employed to form the impact beam. Alternatively, a rod member having a rectangular cross-section may be employed. Further, in the second embodiment of the invention, both of the end portions 32 and 33 of the impact beam 30 are bent downward. Alternatively, both of the end portions 32 and 33 of the impact beam 30 may be bent upward. Further alternatively, one of the end portions 32 and 33 may be bent upward, and the other of the end portions 32 and 33 may be bent downward.

The invention claimed is:

1. A vehicle door structure having a height and a width, comprising:
   an impact beam, said impact beam consisting of a pipe member, said pipe member being bent to form a wavy portion which undulates in the height direction of the vehicle door,
   wherein the wavy portion has a center axis; and
   wherein the wavy portion has both at least a bent top curve positioned over the center axis of the wavy portion and at least a bent bottom curve of the impact beam positioned under the center axis of the wavy portion.

2. The vehicle door structure according to claim 1, wherein at least one end portion of the impact beam is bent upward or downward at an angle with respect to the center axis of the wavy portion.

3. The vehicle door structure according to claim 2, wherein the angle is about 90 degrees.

4. The vehicle door structure according to claim 2, wherein the angle is between about 5 and about 10 degrees.

5. The vehicle door structure according to claim 1, wherein the center axis of the wavy portion extends along a longitudinal direction of the vehicle.

6. The vehicle door structure according to claim 1, wherein at least one end portion of the impact beam is bent upward at an angle with respect to the center axis of the wavy portion.

7. The vehicle door structure according to claim 6, wherein the angle is about 90 degrees.

8. The vehicle door structure according to claim 6, wherein the angle is between about 5 and about 10 degrees.

9. The vehicle door structure according to claim 1, further comprising an inner panel.

10. The vehicle door structure according to claim 9, wherein the impact beam is attached to the inner panel of the door by at least one bracket.

11. The vehicle door structure according to claim 9, wherein the impact beam is attached to the inner panel of the door by a first bracket at a first end and a second bracket at a second end.

12. The vehicle door structure according to claim 1, wherein said impact beam extends substantially in the width direction.

13. An impact beam for a vehicle door, said door having a height and a width, said impact beam comprising:
   a hollow pipe member being bent to form a wavy portion which undulates in a height direction of the vehicle door,
   wherein said impact beam extends substantially in the width direction,
   wherein the wavy portion has a center axis; and
   wherein the wavy portion has both at least a bent top curve of the impact beam positioned over the center axis of the wavy portion and at least a bent bottom curve of the impact beam positioned under the center axis of the wavy portion.

14. The impact beam of claim 13, wherein said pipe member has a circular cross-section.

15. The vehicle door structure according to claim 14, wherein the impact beam consists of one pipe member.

16. A vehicle door structure having a height and a width, comprising:
   an inner panel; and
   an impact beam comprising a pipe member being bent to form a central wavy portion which undulates in the height direction of the vehicle door,
   said impact beam being attached to the inner panel such that the impact beam extends substantially in the width direction,
   wherein the wavy portion has both at least a bent top curve positioned over the center axis of the wavy portion and at least a bent bottom curve positioned under the center axis of the wavy portion.

17. The vehicle door structure according to claim 16, wherein the impact beam consists of the pipe member.

18. The vehicle door structure according to claim 16, wherein the impact beam is attached to the inner panel of the door by at least one bracket.

19. The vehicle door structure according to claim 16, wherein the wavy portion comprises a plurality of V-shapes.

20. The vehicle door structure according to claim 1, wherein the impact beam consists of only one pipe member.

21. The vehicle door structure according to claim 13, wherein the impact beam consists of only one pipe member.

22. The vehicle door structure according to claim 16, wherein the impact beam consists of only one pipe member.

* * * * *